United States Patent [19]

Mann

[11] 4,098,033
[45] Jul. 4, 1978

[54] SAND BLASTING APPARATUS

[76] Inventor: Douglass M. Mann, c/o Niranium Corp., 34-37 Eleventh St., Long Island City, N.Y. 11106

[21] Appl. No.: 837,751

[22] Filed: Sep. 29, 1977

[51] Int. Cl.² .............................................. B24C 9/00
[52] U.S. Cl. ...................................... 51/426; 51/272; 160/23 R; 134/200
[58] Field of Search ................. 51/272, 426; 134/113, 134/200; 160/23 R, 241; 221/155; 225/41, 43

[56] References Cited

U.S. PATENT DOCUMENTS

| 554,439 | 8/1895 | Landis | 51/272 X |
|---|---|---|---|
| 774,314 | 11/1904 | Ebert | 225/41 X |
| 2,401,056 | 5/1946 | Dilley | 51/272 X |
| 2,882,890 | 4/1959 | Shaw | 160/241 X |
| 3,099,397 | 7/1963 | Abbott | 160/241 X |
| 3,516,205 | 6/1970 | Thomson | 51/426 X |
| 4,038,155 | 7/1977 | Reber | 134/200 X |

Primary Examiner—Gary L. Smith
Attorney, Agent, or Firm—Bauer, Amer, & King

[57] ABSTRACT

As a replacement for a permanently installed glass window of the sand blast cabinet of a product-finishing apparatus, which window, as might be surmised, is unavoidably scratched by sand or other abrasive particles during operation of the apparatus and thus ultimately becomes difficult to see through, the within invention contemplates use of a clear plastic strip, put up in a supply roll, and so arranged that successive length portions are unwound therefrom, when needed, to provide a window with optimum visibility through which the sanding or product-finishing operation is readily supervised.

4 Claims, 4 Drawing Figures

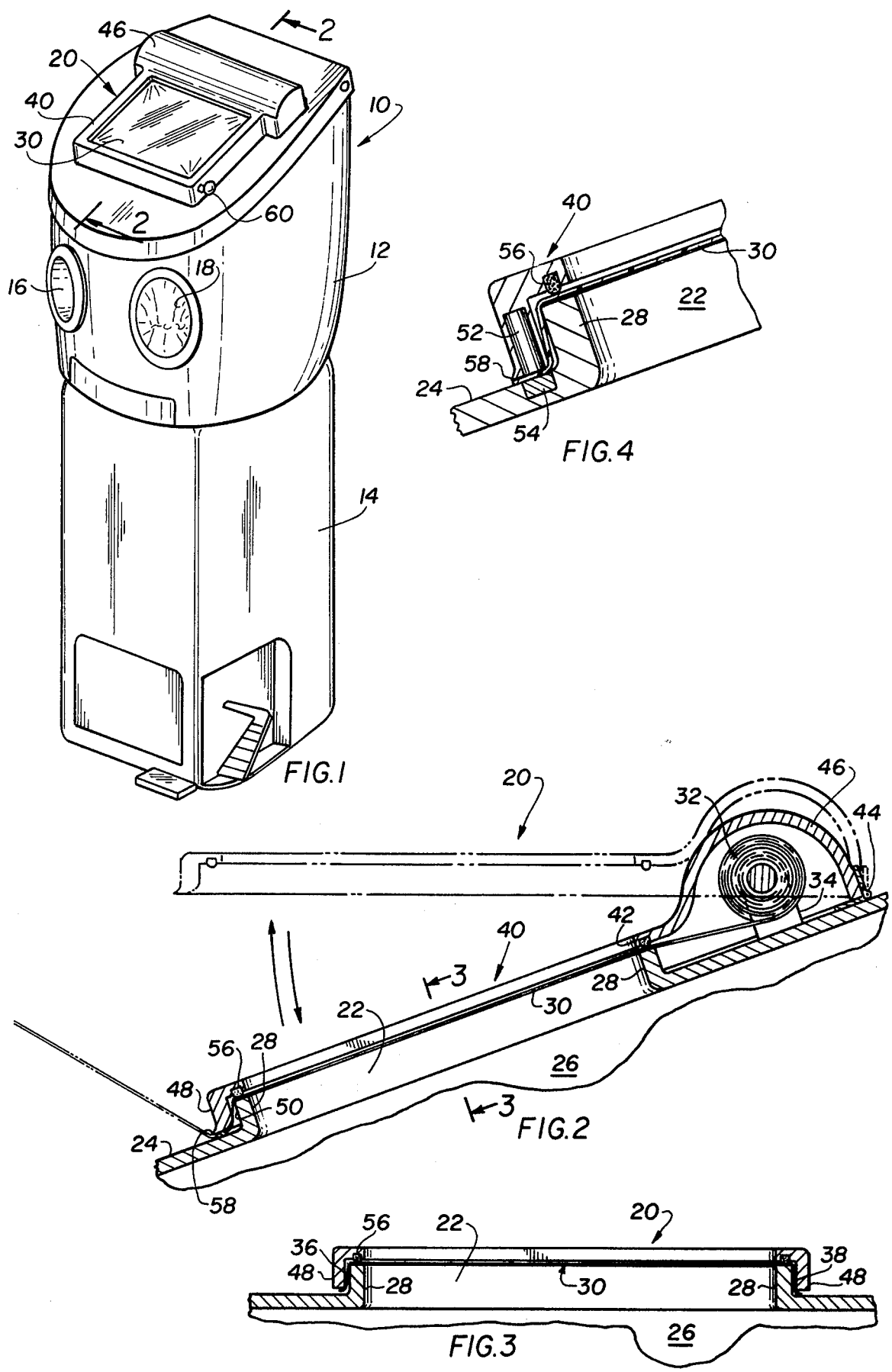

SAND BLASTING APPARATUS

The present invention relates generally to improving the conditions of supervising the finishing of molded products or the like in the sand blast cabinet of a finishing apparatus, and more particularly to effectively obviating use, or any need to use, a permanently installed viewing window which unavoidably becomes scratched and difficult to see through. Instead, the improved window hereof is a disposable plastic, readily replaced by a clear length portion with high visibility whenever it is required to do so, and yet there is no sacrifice in the effective confinement of the sand blasting operation occuring behind the plastic window.

As understood, the production of molded plastic or metal products, and even wrought jewelry products, requires the cleaning removal of flashes of material, spurs, or the like, which is expeditiously achieved using an abrasive particulate material, usually sand but which could also be particulate-sized walnut shells or a similar material, in a blasting operation. It is also not uncommon to use sand blasting to apply a desired surface finish to the product. Whatever is the objective, the blasting must be effectively confined to a working area bounded by an external housing or cabinet and the product being cleaned or finished appropriately positioned within said work area and changed in its orientation relative to the sand blast to contribute to the cleaning or finishing operation. This changing orientation or manipulation of the product is in response to observed effects of the blasting as viewed from outside the cabinet, said observation being through a glass viewing window. Undoubtedly for safety and similar reasons, the glass window has a firm, permanent-type mounting in the sand blast cabinet, thus making replacement thereof difficult and impractical, even though the abrasive used in the blasting unavoidably scratches the inner surface of the window to an extent that visibility therethrough is severely limited.

Broadly, it is an object of the present invention to provide an improved sand, or other abrasive, blasting apparatus overcoming the foregoing and other shortcomings of the prior art. Specifically, it is an object to arrange for the facilitated replacement when needed, of the material disposed in covering relation over the cabinet window opening thus having available a viewing window with the requisite visibility for proper supervision of the sand blasting operation.

A sand blasting apparatus with an improved viewing window demonstrating objects and advantages of the present invention is comprised of an elongated strip of clear plastic put up in a supply roll and means for mounting said plastic supply roll adjacent one side of the viewing window opening preparatory to unwinding successive length portions therefrom incident to positioning each such unwound length portion in covering relation over said viewing opening. To seal each plastic length portion over the window opening use is made of a pivotally mounted frame movable from a clearance position into an operative position in engaged relation about the peripheral edges of the unwound plastic length portion. In this manner, a freshly clear successive length portion of plastic is readily available as a replacement for a scratched counterpart by merely being unwound from the supply roll.

The above brief description, as well as further objects, features and advantages of the present invention, will be more fully appreciated by the reference to the following detailed description of a presently preferred, but nonetheless illustrative embodiment in accordance with the present invention, when taken in conjunction with the accompanying drawings, wherein:

FIG. 1 is a perspective view of a product-finishing apparatus in which the sand blast cabinet thereof has, in accordance with the present invention, an improved disposable viewing window;

FIG. 2 is a side elevational view, on an enlarged scale, taken in section along line 2—2 of FIG. 1 showing details of the construction of said disposable viewing window;

FIG. 3 is a sectional view taken along line 3—3 of FIG. 2 showing additional structural features of the window; and FIG. 4 is a partial and enlarged scale view, in section, illustrating details of the magnetic latch used in holding closed the window frame member.

Shown in FIG. 1 is a pneumatic apparatus, generally designated 10, of the type that is commonly used to clean and finish molded metal and plastic products wherein pressure air is used to blast sand or other particulate abrasive against the product to remove roughness, to conform dimensions to specifications, to apply a desired surface finish, or for such other purposes. Typically, apparatus 10 includes an upper sand blast cabinet 12 which is assembled on a lower support housing 14 and has necessary structural features to facilitate effectively performing the blasting operation within the cabinet 12. The referred to structural features are not necessary to an understanding of the invention and a detailed description of such features will therefore be omitted. It is helpful to note, nevertheless, that in the contemplated use of the apparatus 10 that the nature of, and the exactness with which the blasting operation is conducted, necessitates the insertion of the gloved hands of the user through hand holes 16 and 18 and the positional adjustment of the product being modified during the blasting operation in accordance with what is observed through the viewing window, generally designated 20, which is provided in the upper portion of the cabinet 12. The crux of the present invention resides in the improvements embodied in the window 20 as will now be described in detail and as illustrated generally in FIG. 1 and in more detail in the sectional views of FIGS. 2-4. Before proceeding with such description, however, it should be further noted that during the sand blasting which occurs within the cabinet 12 that some of the sand unavoidably makes contact with the see-through member, whether it be glass or otherwise, of the window 20, and thus produces scratches thereon which ultimately results in significantly diminishing visibility or the clarity of vision that is possible through the window 20. Improvements of the present invention are addressed to solving or greatly minimizing this prior art problem.

As perhaps may be readily appreciated from consideration of the sectional views of FIGS. 2 and 3 in conjunction with FIG. 1, window 20 consists of a generally rectangular opening 22 in the upper wall 24 of cabinet 12 that communicates with the internal work compartment 26 that is bounded by the cabinet 12. More particularly, rectangular opening 22 in the wall 24 is delineated by an upturned lip 28. The see-through portion of window 20 is not glass but instead is, according to the present invention, a strip of an appropriate clear plastic 30, i.e. polyethylene, vinyl or similar material, which is put up in a supply roll 32. Roll 32 is appropriately mounted on trunnion type supports 34 so that supply lengths of the plastic are readily unwound from the roll 32 as needed. In this respect, it will be understood that the width of the plastic strip 30 is sized to extend fully across the width of the opening 22, thus resulting in peripheral or marginal edges 36 and 38 extending over and beyond the lips 28 which function as sides for the opening 22, all as is clearly illustrated in FIG. 3.

Cooperating with the window opening 22, in the sense that with the plastic length portion 30 it functions as a closure for this opening, is a pivotally mounted rectangular frame 40 having an opening 42 of a size corresponding to that of the size of opening 22. Frame 40 is attached along one edge by a hinge 44 to the upper wall 24 of cabinet 12 so as to be pivotally traversable between open and closed positions with respect to the window opening 22, these positions of movement being respectively illustrated in phantom and full line perspective in FIG. 2. At its hinged edge, designated 46, frame 40 has a suitably curved configuration to accommodate the supply roll of plastic 32. To cooperate with the upstanding lip 28 of cabinet or housing 12, frame 40 has a depending lip 48 along three sides thereof, which lip 48, in the closed position of the frame 40, occupies a position closely adjacent to the lip 28. The leading edge of the plastic length portion 30 is appropriately threaded through the clearance 50 between the lips 28 and 48 while a diminished clearance between the cooperating lips 28 and 48 which function as sides for the opening 22, as illustrated in FIG. 3, contributes to a frictional engagement of the extending marginal portions 36 of the plastic length 30. This frictional engagement is effective to hold the plastic window portion 30 in place during the blasting operation.

The holding of the frame 40 in a closed position over the window opening 22 and in holding relation against the plastic length portion 30 is also enhanced by the use of a conventional magnetic latch consisting of a magnet 52 and a magnetizable body 54 respectively appropriately operatively disposed in the frame 40 and upper cabinet wall 24. The magnetic pull exerted by the magnetic latch 52, 54 is effective in urging frame 40 through closing movement against the upstanding lip 28 of window 22, and advantageous use is made of this magnetic pull by including in the construction of a preferred embodiment of the frame 40 a depending elastomeric sealing member 56 in position to make sealing contact against the upper edge of the lip 28, all as is clearly illustrated in FIG. 4. In this way, although a permanently installed pane of glass is not used as a closure for the opening 22 and the same function is provided by a disposable length portion of plastic 30, this is not at any sacrifice in the ability to seal the opening 22 against contamination of the surrounding working area by sand utilized in the sand blasting operation occurring with the cabinet 22.

From the description already provided it should be appreciated that when the length portion of the plastic 30 which functions as the see-through portion of the viewing window 20 is scratched to the point where visibility is marred, it is necessary only to unwind a freshly clear successive length portion from roll 32 as a replacement for the portion that is scratched. To facilitate removal of the scratched length portion of the plastic 30 serrated teeth 58 are provided along the front edge of the frame 40, as at 58. Completing the frame 40 and as illustrated in FIG. 1, for lifting and lowering the frame member 40, use is made of a laterally extending handle 60.

From the foregoing description it should be readily appreciated that the embodiment of the disposable window 30 for the blasting apparatus 10 significantly enhances its utility in that it readily makes available a see-through material that allows optimum visibility for supervision of the operation occurring within the sand blast cabinet 12, and yet the disposable nature thereof is provided without sacrificing any of the advantages of a viewing window of glass or other permanent construction material.

In the preceding description, as well as in the claims which follow, the reference to "sand" is intended to have sufficient scope to include any equivalent abrasive in particulate form, such as particulate-sized walnut shells, and other such materials. In other respects as well a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In a sand blasting apparatus useful for the cleaning of molded products or the like of the type including a housing bounding an internal blasting compartment and having a viewing opening into said compartment, the improvement thereto comprising an elongated strip of clear plastic put up in a supply roll, means mounting said plastic supply roll adjacent one side of said viewing opening for unwinding successive length portions therefrom incident to positioning each such unwound length portion in covering relation over said viewing opening, and a pivotally mounted frame movable from a clearance position into an operative position in engaged relation about the peripheral edges of such unwound plastic length portion functioning as said viewing opening cover, whereby supervision of said blasting operation is facilitated by the view thereof as afforded through said plastic and a freshly clear successive length portion thereof is readily available as a replacement by being unwound from said supply roll.

2. The improved apparatus as defined in claim 1 including an upstanding lip in surrounding relation about said viewing opening, and wherein said frame has a cooperating lip extending therefrom adapted to occupy a position closely adjacent to said upstanding lip in said operative position of said frame, whereby said plastic is effectively held in place in covering relation over said viewing opening by virtue of the frictional engagement of the peripheral edges thereof between said lips of said housing and of said frame.

3. The improved apparatus as defined in claim 2 wherein said edge of said frame remote from said pivot axis has cutting means therealong, to thereby facilitate the severing of a length portion of said plastic incident to the replacement thereof.

4. The improved apparatus as defined in claim 3 including an elastomeric sealing member mounted in depending relation about said frame, and cooperating magnet means in said housing and in said frame effective to simultaneously urge said frame through closing movement over said viewing opening and to maintain said operative closed position thereof, said closing movement of said frame also establishing sealing contact of said elastomeric sealing member about said viewing opening.

* * * * *